(No Model.) 2 Sheets—Sheet 1.
O. PIHLFELDT.
CYCLE PEDAL.
No. 557,507. Patented Mar. 31, 1896.
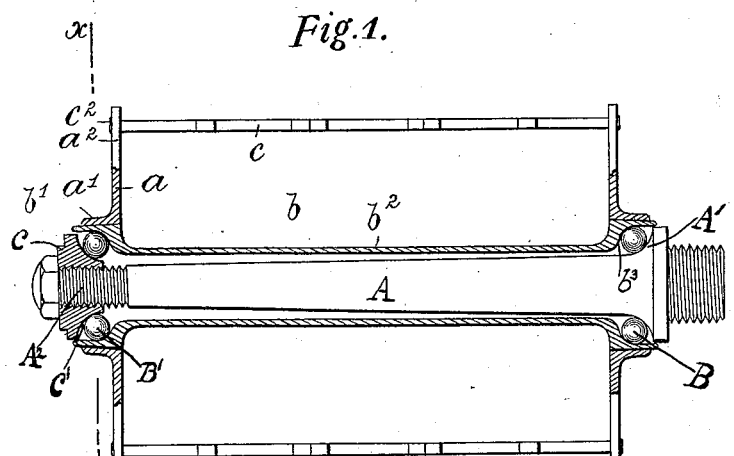
Fig. 1.
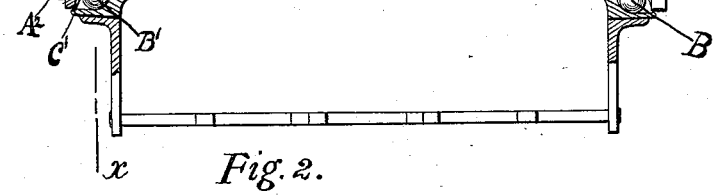
Fig. 2. Fig. 3.
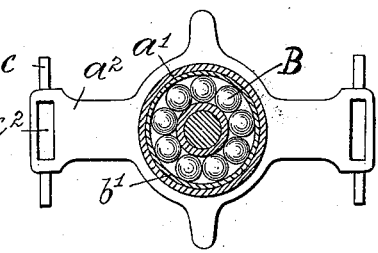
Fig. 4.
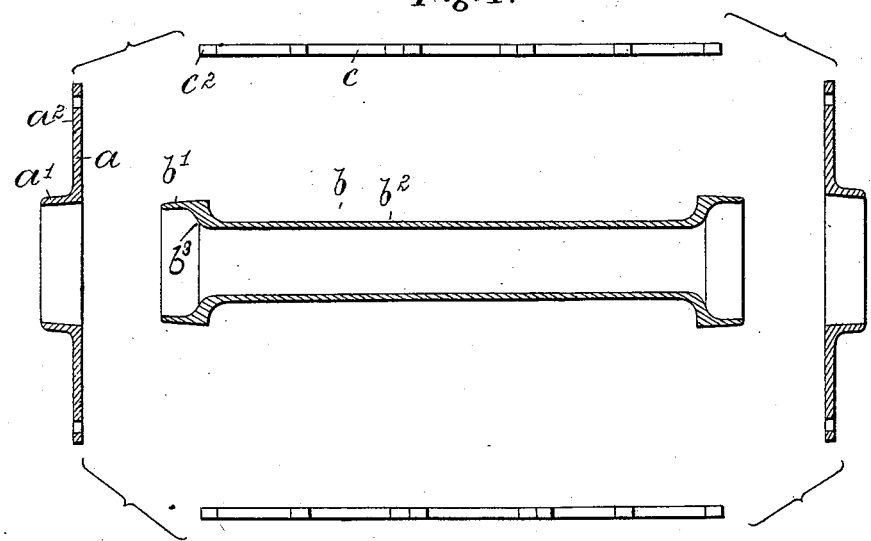
WITNESSES
Hy. Carrett
Arthur T. Sadler
INVENTOR
Olaf Pihlfeldt (No Model.) 2 Sheets—Sheet 2.

O. PIHLFELDT.
CYCLE PEDAL.

No. 557,507. Patented Mar. 31, 1896.

WITNESSES
INVENTOR

UNITED STATES PATENT OFFICE.

OLAF PIHLFELDT, OF BIRMINGHAM, ENGLAND.

CYCLE-PEDAL.

SPECIFICATION forming part of Letters Patent No. 557,507, dated March 31, 1896.

Application filed January 23, 1895. Serial No. 535,942. (No model.) Patented in England May 29, 1890, No. 10,376.

*To all whom it may concern:*

Be it known that I, OLAF PIHLFELDT, engineer, a subject of the King of Norway and Sweden, residing at Golden Hillock Road, in the city of Birmingham, England, have invented certain new and useful Improvements in Cycle-Pedals; and I do hereby declare the following to be a full, clear, and exact description of the invention, reference being had to the accompanying drawings, which form part of this specification, and for which invention Letters Patent of Great Britain have been granted to me, bearing date May 29, 1890, No. 10,376.

My invention relates to improvements in cycle-pedals, and has for its object the provision of means for securing the end plates to the hub or tubular middle member through which the spindle passes, and ball-bearings and means for holding the same in place.

To these ends the invention consists in a pedal-spindle, a hollow tubular hub or middle member surrounding the spindle, end cases or hollow heads made solid with said hub or middle member and having their peripheries slightly coned, as shown, and provided with open mouths or ends sunken and formed into ball-races, ball-bearings resting in said races, means for holding said ball-bearings in place, and end plates, each of which is provided with a centrally-located, laterally - extended, and interiorly - coned socket-bearing adapted to take and fit tightly upon the coned heads or cases of the hub or middle member, the said plates being connected by treads.

In my invention the end plates, which have bossed-eyed or inside-cone-socketed middle parts, are fitted to the hollow heads or case ends of the tubular middle member or hub by the said coned sockets taking upon the outside-coned peripheries of the said heads and being there affixed by the forcing of the socket part over the head part or by closing the metal at the end of the one slightly over the metal at the end of the other.

Figure 5:
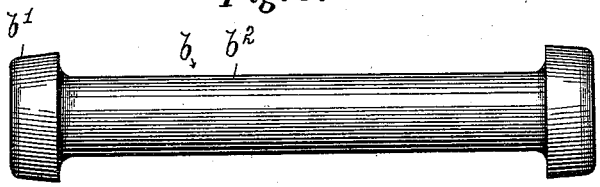
Figure 6:
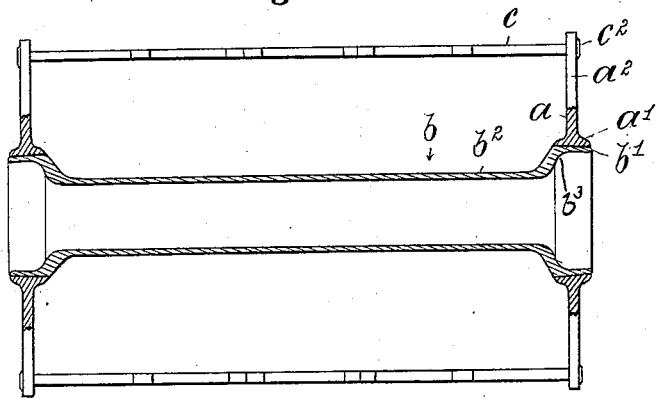
Figure 7:
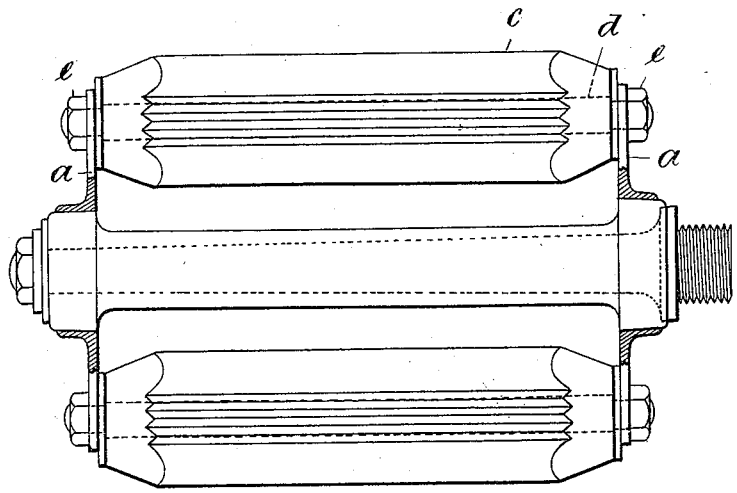

Figure 1 of the accompanying drawings represents a horizontal section, partly in elevation, of a rat-trap cycle-pedal constructed according to my invention. Fig. 2 represents an end view of the pedal, Fig. 1, showing the left-hand end plate or end part of the said pedal and also the bossed-eye or inside-coned socket of it, wherein a coned head or case at one end of the tubular middle member takes. Fig. 3 represents a cross-section of the pedal upon the dotted lines $x\ x$, Fig. 1, looking toward the end plate. Fig. 4 represents in section and in elevation parts of the said pedal separated. Fig. 5 represents an elevation of the hub or tubular middle member. Fig. 6 represents parts in a modified form of my invention. Fig. 7 represents my invention applied to a rubber-tread pedal.

The same letters of reference indicate corresponding parts in all the figures of the drawings.

In the said drawings, the reference-letter $a$ represents the end plates provided with centrally-located, laterally-extended, and interiorly-coned socket-bearings $a'$, and $b$ represents the hollow tubular hub or middle member, having a contracted waist $b^2$ and provided with end cases or hollow heads $b'$, which are exteriorly coned and adapted to fit lightly into the interiorly-coned socket-bearings $a'$ of the end plates.

The letter $c$ indicates the treads, riveted or otherwise connected at $c^2$ to the extremities $a^2$ of the end plates $a$.

The end cases or heads $b'$ are provided with sunken mouths $b^3$, forming ball-races furnishing half of the bearing-surface for the ball-bearings hereinafter referred to.

The pedal-spindle A passes through the tubular hub or middle member $b$, and at its inner end is formed with a concave enlargement A', which coöperates with the ball-race of the corresponding end of the hub to confine and complete the bearing-surface for the inner series of balls B. The outer extremity of said spindle is screw-threaded at $A^2$ for the reception of a confining-nut C, having a concave face C' coöperating with the ball-race of the outer coned head $b'$ to complete the bearing-surface for and confine the outer series of balls B'.

In Fig. 6 the bearings of bossed-eyed or inside-coned sockets $a'$ are disposed about evenly upon the two opposite sides of the end plates $a$, instead of the said plates coming at the inner side parts of the said bosses or sockets, as in the preceding figures.

In the rubber pedal, Fig. 7, the end plates $a$ are braced together by bolts or rods $c$, passing through the axes of rubber treads $d$ and being affixed by nuts $e$ taking upon the screwed ends of the said rods, or the ends of the said rods may be riveted.

Having fully described my invention, what I desire to claim and secure by Letters Patent is—

In a cycle-pedal, the combination with the end pedal-plates having the centrally-located, laterally-extended, and interiorly-coned socket-bearings, of the tubular middle member having exteriorly-coned heads fitted into the said sockets of the end plates and formed with suitable ball-races, treads connected with the outer ends of said plates, a spindle passing through the tubular middle member, balls arranged in the races of the coned heads, and means for confining or holding said balls in place, substantially as described.

In testimony that I claim the foregoing I have hereunto set my hand this 8th day of January, 1895.

OLAF PIHLFELDT.

Witnesses:
 HY. SKERRETT,
 ARTHUR T. SADLER.

It is hereby certified that in Letters Patent No. 557,507, granted March 31, 1896, upon the application of Olaf Pihlfeldt, of Birmingham, England, for an improvement in "Cycle-Pedals," errors appear requiring correction as follows: The English patent previously obtained for the said invention is erroneously described in the printed heading and in the preamble of the specification as "May 29, 1890, No. 10,376;" whereas it should have been described as *May 29, 1894, No. 10,376*, and that the said Letters Patent should be read with these corrections therein that the same may conform to the record of the case in the Patent Office.

Signed, countersigned, and sealed this 26th day of May, A. D. 1896.

[SEAL.]

JNO. M. REYNOLDS,
*Assistant Secretary of the Interior.*

Countersigned:
    S. T. FISHER,
        *Acting Commissioner of Patents.*